United States Patent [19]

Oya et al.

[11] Patent Number: 5,280,862
[45] Date of Patent: Jan. 25, 1994

[54] TAPE CASSETTE AND LEADER-TRAILER TAPE THEREFOR

[75] Inventors: Kinichiro Oya, Kawasaki; Kimitaka Nakamura, Yokohama, both of Japan

[73] Assignee: TDK Corporation, Tokyo, Japan

[21] Appl. No.: 626,267

[22] Filed: Dec. 12, 1990

[30] Foreign Application Priority Data

Dec. 18, 1989 [JP] Japan .................... 1-326053

[51] Int. Cl.⁵ .................... B65H 75/28; G11B 5/72
[52] U.S. Cl. .................... 242/199; 242/74; 242/58.1
[58] Field of Search ............ 242/74, 199, 56 R, 58.5, 242/58.1; 156/192, 157, 302, 269, 297

[56] References Cited

U.S. PATENT DOCUMENTS

| | | | |
|---|---|---|---|
| 2,539,676 | 1/1951 | Sontag et al. | 242/74 X |
| 2,541,476 | 2/1951 | Mihalyi | 242/74 X |
| 2,900,868 | 8/1959 | Gaffney, Jr. | 242/74 X |
| 3,622,420 | 11/1971 | Knox | 242/199 X |
| 3,695,553 | 10/1972 | Everett | 242/199 |
| 4,062,719 | 12/1977 | Masuzima et al. | 156/502 |

FOREIGN PATENT DOCUMENTS

| | | |
|---|---|---|
| 0018584 | 11/1980 | European Pat. Off. |
| 51-21784 | 7/1976 | Japan |
| 503557 | 4/1939 | United Kingdom |

*Primary Examiner*—John M. Jillions
*Attorney, Agent, or Firm*—Price, Gess & Ubell

[57] ABSTRACT

A tape cassette and a leader-trailer tape therefor capable of ensuring safe and positive connection between a leader-trailer tape and a magnetic tape, to thereby permit the magnetic tape to travel in a cassette casing with high reliability. The leader-trailer tape is provided thereon with a pressure-sensitive or heat-sensitive adhesive layer, so that the leader-trailer tape may be joined directly to the magnetic tape by heating or pressurizing while overlapping the tape body. Thus, the handling of the leader-trailer tape and the joining between the leader-trailer tape and the tape body may be facilitated without using any splicing tape and without causing any trouble such as sticking of the adhesive to a cutter.

7 Claims, 2 Drawing Sheets

TAPE CASSETTE AND LEADER-TRAILER TAPE THEREFOR

BACKGROUND OF THE INVENTION

This invention relates to a tape cassette such as a magnetic tape cassette or the like and a leader-trailer tape therefor, and more particularly to a leader-trailer tape used for a tape cassette having a tape body such as a magnetic tape, a cleaning tape or the like arranged therein and a tape cassette including such a leader-trailer tape.

Conventionally, a tape cassette such as an audio tape cassette, a video tape cassette, a cleaning tape cassette or the like is generally assembled while winding a tape body such as a magnetic tape, a cleaning tape or the like on hubs arranged in a cassette casing in such a manner as disclosed in Japanese Publication No. 21784/1976 or U.S. Pat. No. 4,062,719. More particularly, a tape body or magnetic tape which has a width as produced or is cut into a width suitable for a final product is connected at each of both ends thereof to a leader-trailer tape by means of a splicing tape having an adhesive applied thereto and then wound up on hubs arranged in a cassette casing, resulting in a tape cassette being assembled in the form of an audio tape cassette, a video tape cassette or the like.

In the cassette assembling process described above, for example, a leader-trailer tape cassette is prepared in advance which comprises a cassette casing called a C-O half in audio applications and a T-O half in video applications in the art and a leader-trailer tape of a length as short as about 50 cm received in the cassette casing while being mounted at both ends thereof on a pair of hubs arranged in the cassette casing. Then, the tape body is incorporated in the leader-trailer tape. For this purpose, the leader-trailer tape is drawn out at the intermediate region thereof from the cassette casing by means of a winder. Then, the drawn-out region of the leader-trailer tape is cut at substantially the central portion thereof into two tape sections, of which one end is free and the other end is mounted on the hub. Then, the tape body such as a magnetic tape is abutted at one end thereof against the free end of one of the two cut tape sections of the leader-trailer tape and then a splicing tape is applied to the boundary between the tape section and the tape body in a manner to stretch over both tapes, to thereby join the tape section and tape body to each other.

Subsequently, the tape body is wound up on the hub through the leader-trailer tape section, during which the length of winding-up of the magnetic tape is detected by a tape length detector. When the tape body is wound up in a predetermined length, it is cut. Then, the cut end of the tape body is abutted against the free end of the other leader-trailer tape section and a splicing tape is applied to the boundary between the tape body and the leader-trailer tape section in substantially the same manner as described above. Thereafter, the other leader-trailer tape section is wound up on the other hub, resulting in the tape cassette such as a magnetic tape cassette being assembled.

Unfortunately, the use of the splicing tape for connecting the tape body to the leader-trailer tape causes gaps to be formed between the ends of both tapes, resulting in an adhesive layer applied to the splicing tape being exposed at the gaps. This leads to sticking of the adhesive to various components of the tape cassette to obstruct positive operation of the tape cassette. Also, the gaps cause both tapes to overlap each other at the joint therebetween. Further, the adhesive deposited on the splicing tape generally comprises a soft adhesive, so that it is softened to a degree sufficient to exhibit much flowability at an elevated temperature and hardened to a degree sufficient to lose its adhesive strength at a low temperature. Thus, the adhesive tends to run out from the splicing tape at a high temperature and fail in joining both tapes to each other at a low temperature, resulting in the assembling of the tape cassette being troublesome and the operation of the cassette lacking smoothness and reliability. In addition, this causes the adhesive to stick to a cutter used for cutting the splicing tape, leading to a failure in continuous assembling of the tape cassette.

SUMMARY OF THE INVENTION

The present invention has been made in view of the foregoing disadvantages of the prior art.

Accordingly, it is an object of the present invention to provide a tape cassette which is capable of ensuring safe and positive connection between a leader-trailer tape and a tape body, to thereby permit the tape body to travel in a cassette casing with high reliability.

It is another object of the present invention to provide a tape cassette which is capable of ensuring safe and positive connection between a leader-trailer tape and a tape body, to thereby be readily assembled and operated with reliability.

It is a further object of the present invention to provide a tape cassette which is capable of significantly improving the productivity and quality.

It is still another object of the present invention to provide a leader-trailer tape for a tape cassette which is capable of facilitating assembling of a tape cassette and ensuring smooth operation of the tape cassette with reliability.

It is yet another object of the present invention to provide a leader-trailer tape for a tape cassette which is capable of significantly improving productivity and quality of a tape cassette.

It is even another object of the present invention to provide a leader-trailer tape for a tape cassette which is capable of ensuring safe and positive arrangement of a tape body in a casing.

It is a still further object of the present invention to provide a leader-trailer tape for a tape cassette which is capable of permitting a tape body to safely travel in a casing with high reliability.

It is a yet further object of the present invention to provide a leader-trailer tape for a tape cassette which is capable of being joined to a tape body without using any splicing tape.

It is an even further object of the present invention to provide a leader-trailer tape for a tape cassette which is capable of being joined with a tape body while eliminating the formation of any gap and/or tearing at the joint between the tape body and the leader-trailer tape and the running-out of an adhesive at the joint.

In accordance with one aspect of the present invention, a tape cassette is provided. The tape cassette includes a tape body and a leader-trailer tape joined to the tape body. The leader-trailer tape comprises a base film and an adhesive layer arranged on at least the portion of the base film joined to the tape body.

In accordance with another aspect of the present invention, a leader-trailer tape for a tape cassette is provided. The leader-trailer tape comprises a base film and an adhesive layer provided on at least the portion of the base film joined to a tape body of the tape cassette.

In the present invention constructed as described above, the leader-trailer tape includes the pressure-sensitive or heat-sensitive adhesive layer arranged on the overall length of the base film or on the desired portion thereof. The leader-trailer tape is joined to the tape body through the adhesive layer while the leader-trailer tape overlaps the tape body through the adhesive layer. If the adhesive layer is the pressure-sensitive type, a pressure-sensitive adhesive is preferably used therefor which exhibits an adhesive action when it is placed under a pressure of for example, 5 to 10 kg/cm$^2$ larger than a pressure of, for example, 0.1 to 2 kg/cm$^2$ to which the adhesive layer is generally exposed in use of the tape cassette. Alternatively, in the case that a heat-sensitive adhesive is used for the adhesive layer, it preferably exhibits an adhesive action when it is placed at a temperature of, for example, 200° to 300° C. higher than a temperature of, for example, 50° to 100° C. to which the adhesive layer is generally exposed in use of the tape cassette. Thus, for the purpose of joining the leader-trailer tape to the tape body, high pressure or heat is applied to the portions of the adhesive layer positioned at the boundary between the tape body and the leader-trailer tape and/or adjacent thereto.

Thus, the present invention effectively eliminates the use of any splicing tape for joining the leader-trailer tape and the tape body to each other and prevents the adhesive from sticking to other components of the tape cassette when the tape cassette is used in a usual manner. Also, the above-described construction of the leader-trailer tape prevents any gap from being formed between both tapes, resulting in preventing the adhesive from running out from the leader-trailer tape.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals like or corresponding parts throughout; wherein.

DETAILED DESCRIPTION OF THE PREFERRED EMBODIMENTS

Now, the present invention will be described hereinafter with reference to the accompanying drawings.

The following description will be illustratively made in connection with an audio magnetic tape cassette wherein a tape body comprises an audio magnetic tape, however, the present invention is not limited to such a magnetic tape cassette.

Figure 1:
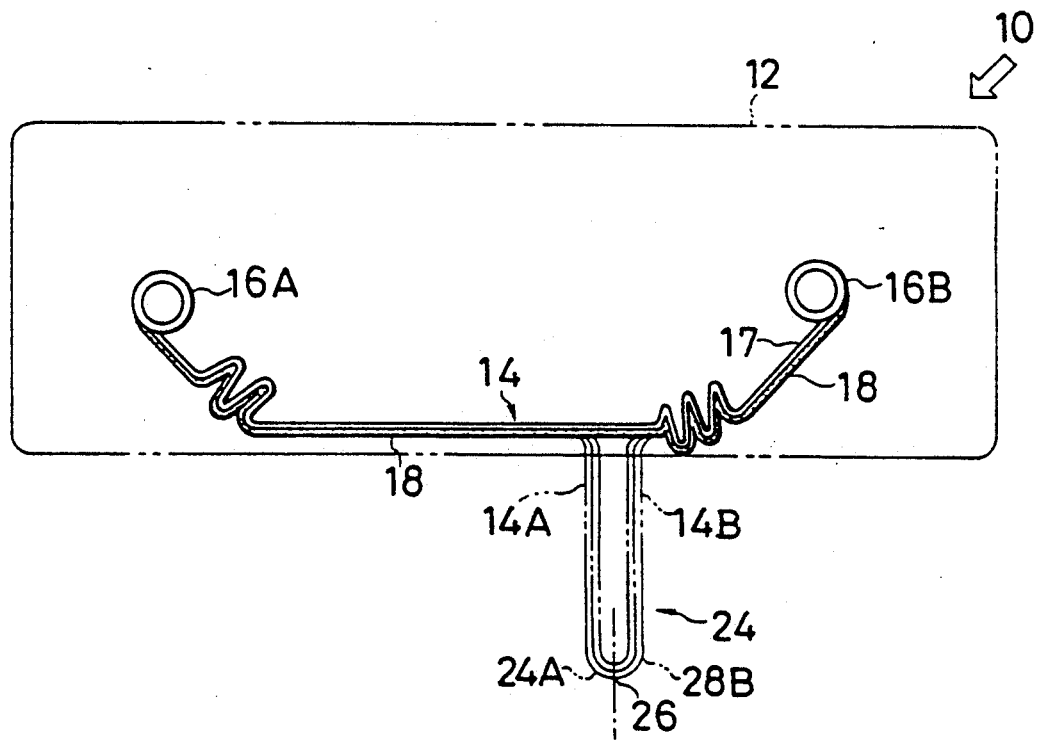
FIG. 1 is a schematic plan view showing an embodiment of a tape cassette according to the present invention, in which a leader tape is incorporated in a cassette casing to constitute a leader-trailer tape cassette.

FIG. 1 shows a leader-trailer tape cassette 10 including a cassette casing 12 and a leader-trailer tape 14 mounted at both ends thereof on a pair of hubs 16A and 16B arranged in the cassette casing 12. The leader-trailer tape 14 is provided with a pressure-sensitive or heat-sensitive adhesive layer 18 on at least the intermediate or central region thereof through which a tape body or magnetic tape 20 is joined to the leader-trailer tape 14, resulting in joints 22 being formed therebetween as described hereinafter. Alternatively, the adhesive layer 18 may be applied to the whole length of the leader-trailer tape 14. The so-constructed leader-trailer tape 14 is then wound up on the hubs 16A and 16B, resulting in the leader-trailer tape cassette 10 being constructed.

In the illustrated embodiment, the leader-trailer tape 14 is formed into a length of about 50 to 75 cm and comprises a base film 17 and the above-described pressure-sensitive or heat-sensitive adhesive layer 18 applied over the whole length of one surface of the base film 17 or to the substantially central or intermediate region of one surface of the base film to be cut. In the illustrated embodiment, the adhesive layer 18 is applied to the substantially overall length of the base film 17. Alternatively, if required, a plurality of such adhesive layers 18 of a predetermined length may be intermittently arranged on the base film 17 in a manner to be spaced from each other at predetermined intervals, so that the leader-trailer tape 14 may be optionally cut at any one of various portions thereof.

If the adhesive layer 18 is the pressure-sensitive type, a pressure-sensitive adhesive is preferably used therefor which exhibits an adhesive action when it is placed under a pressure of, for example, 5 to 10 kg/cm$^2$ larger than a pressure of, for example, 0.1 to 2 kg/cm$^2$ to which the adhesive layer 18 is typically exposed in use of the tape cassette. Alternatively, in the case that a heat-sensitive adhesive is used for the adhesive layer 18, it preferably exhibits an adhesive action when it is placed at a temperature of, for example, 200° to 300° C. higher than a temperature of, for example, 50° to 100° C. to which the adhesive layer is typically exposed in use of the tape cassette. Such construction of the adhesive layer 18 effectively prevents the adhesive used from sticking to various components of the tape cassette in both use and non-use of the tape cassette even when the adhesive layer 18 is applied to the portion of the base film 17 other than the intermediate region thereof at which the joints 22 are formed as described below, because the components are not substantially exposed to the above-described high pressure and temperature at which the adhesive exhibits the adhesive action.

Figure 2:
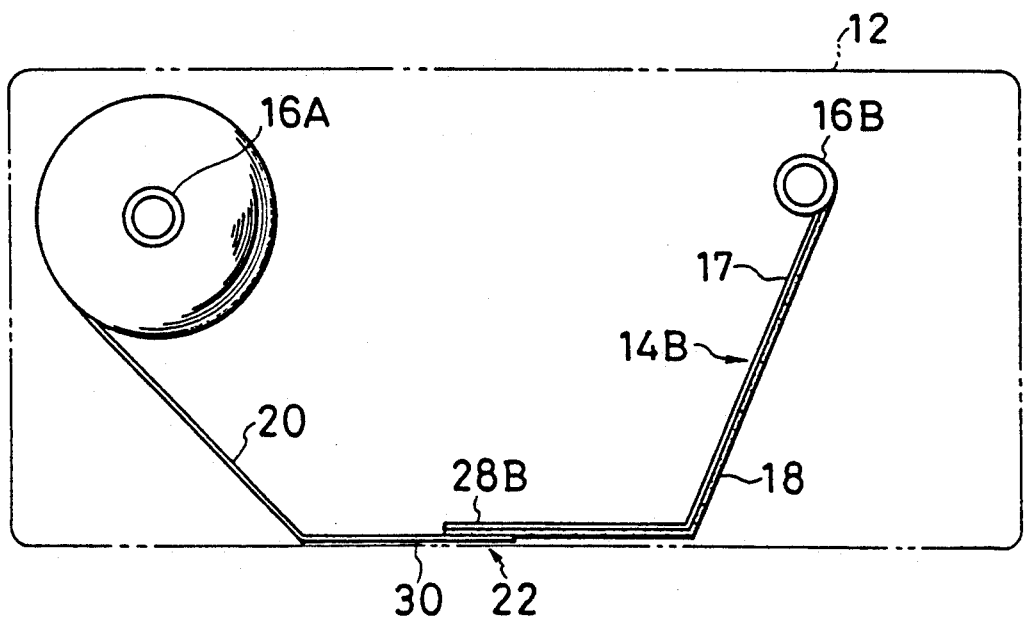
FIG. 2 is a schematic plan view of the tape cassette shown in FIG. 1, in which a magnetic tape wound up on a hub is joined to the leader-trailer tape to constitute a tape cassette.
Figure 3:
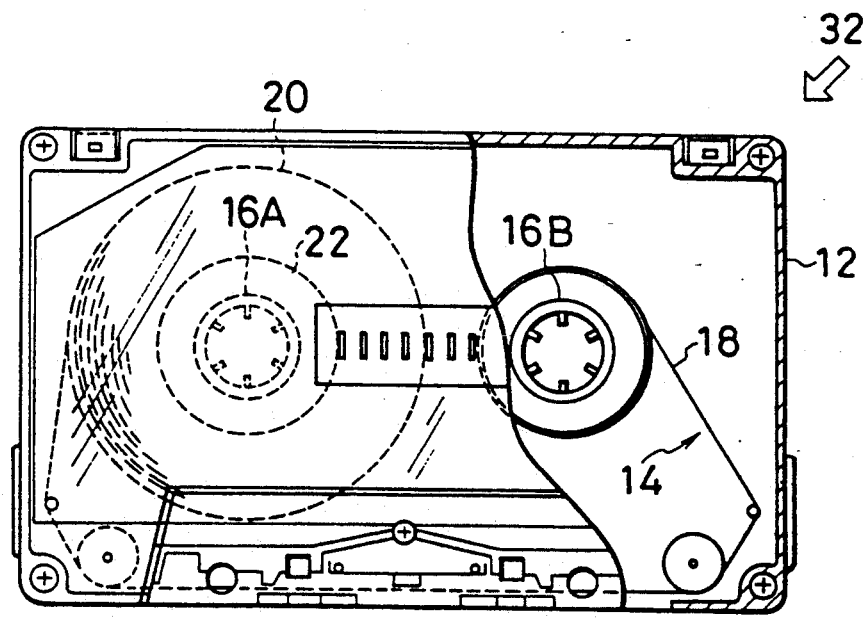
FIG. 3 is a partly broken plan view showing an audio magnetic tape cassette which is an example of a tape cassette of the present invention.

Now, the joining between the leader-trailer tape 14 and the tape body or magnetic tape 20 and more particularly the incorporation of the magnetic tape 20 into the leader-trailer tape cassette 10 for forming a magnetic tape cassette will be described hereinafter with reference to FIGS. 1 to 3, wherein the description will be made supposing that the adhesive layer 18 is applied to the overall length of the leader-trailer tape 14.

First, the leader-trailer tape 14 is drawn out at the intermediate region thereof generally designated at reference numeral 24 from the cassette casing 12, resulting in the intermediate section 24 being in a loop-like shape, as shown in FIG. 1. Then, the drawn-out intermediate region 24 of the leader-trailer tape 14 is cut at the substantially central portion thereof, so that the cut leader-trailer tape 14 divided into two leader-trailer tape sections 14A and 14B each having free ends 28A and 28B, respectively, between which the tape body or magnetic tape 20 is interposedly connected or joined. The magnetic tape 20 may be a recorded tape or a non-recorded tape.

For the purpose of joining the magnetic tape 20 to the leader-trailer tape 14, to the free end 28A of the leader-trailer tape section 14A mounted on the hub 16A on which the whole magnetic tape is to be wound up in the assembling of the tape cassette is adhesively joined the distal end of the magnetic tape 20 drawn from a tape reel (not shown) by heating or pressurizing. Then, the leader-trailer tape section 14A is wound up on the hub 16A, so that the magnetic tape 20 may be subsequently wound up thereon. Thereafter, the winding-up of the magnetic tape 20 on the hub 16A in a predetermined length is detected by a tape length detector (not shown) to stop rotation of the hub 16A and then the magnetic tape 20 is cut, resulting in being formed with a free end 30. Subsequently, the free end 30 of the magnetic tape 20 is adhesively joined, by heating or pressurizing, to the free end 28B of the leader-trailer 14B mounted on the other hub 16B while overlapping the free end 28B of the leader-trailer tape section 14B through the adhesive layer 18, to thereby form the joint 22, as shown in FIG. 2, thus, the magnetic tape cassette is completed as indicated at reference numeral 32 in FIG. 3. The manner of joining between the leader-trailer tape section 14B and the magnetic tape 20 described above with reference to FIG. 2 may be applied to the joining between the leader-trailer tape section 14A and the magnetic tape 20 described above.

Figure 4:
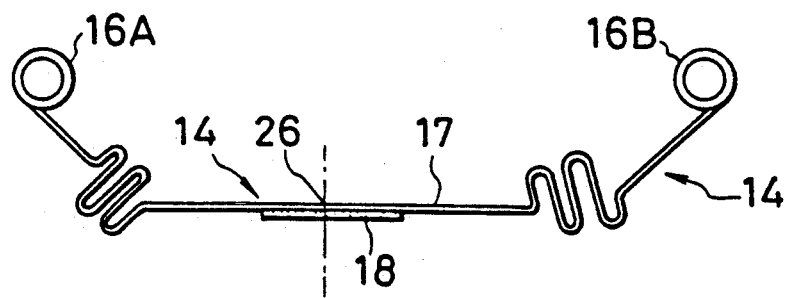
FIG. 4 is schematic plan view showing another embodiment of a leader-trailer according to the present invention.

Referring now to FIG. 4 showing another example of a leader-trailer tape incorporated in the tape cassette of the present invention, a leader-trailer tape 14 of the illustrated embodiment which is mounted at both ends thereof on both hubs 16A and 16B comprises a base film 17 and an adhesive layer 18 applied to only the central region of the base film 17 at which the leader-trailer tape 14 is cut for the purpose of being joined to a magnetic tape. The application of the adhesive layer 18 may be carried out in a predetermined length such as, for example, several centimeters. The adhesive layer 18 may be heat-sensitive or pressure-sensitive. Also, the application of the adhesive layer 18 to the base film 17 may be accomplished by printing or the like. When the leader-trailer tape 14 constructed as described above is cut at the central portion 26 into two parts, the adhesive layer is disposed at only each of the cut ends of the leader-trailer tape 14. Thus, the magnetic tape is adhesively joined at both ends thereof to the cut ends of the leader-trailer tape 14 through the adhesive layer 18 in the substantially the same manner as described above.

The above description has been illustratively made in connection with the audio magnetic tape cassette, however, the present invention may be likewise applied to a video magnetic tape cassette which includes a tape body comprising a video magnetic tape, a cleaning tape cassette which includes a tape body comprising a cleaning tape or the like.

As can be seen from the foregoing, the tape cassette of the present invention is so constructed that the leader-trailer tape is provided thereon with the pressure-sensitive or heat-sensitive adhesive layer, so that the leader-trailer tape may be joined directly to the tape body such as a magnetic tape, a cleaning tape or the like without using any auxiliary means provided separate from the leader-trailer tape. Thus, the handling of the leader-trailer tape and the joining between the leader-trailer tape and the tape body may be facilitated without causing any trouble such as sticking of the adhesive to a cutter, so that the assembling of the tape cassette is simplified to improve productivity of the tape cassette. Also, in the present invention, the leader-trailer tape is joined to the tape body by heating or pressurizing while overlapping the tape body. Such joining effectively preventing any gap from being formed between the leader-trailing tape and the tape body, to thereby prevent the adhesive from being exposed to stick to various components of the tape disc. This ensures safe and smooth traveling and winding-up of the tape body, resulting in the tape cassette exhibiting satisfactory reliability in use.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A tape cassette comprising:
   a cassette housing having first and second rotatable hubs within a cavity;
   a pair of leader-trailer tapes having a base film attached, respectively, to each hub, and of a length to extend out of the cassette housing cavity, the base film of each leader-trailer tape being coated on one side with an adhesive layer that extends from the respective hub through the entire length of the base film that would extend out of the tape housing body; and
   a recording tape of a predetermined length attached, respectively, to only a portion of each leader-trailer tape adhesive layer, with the adhesive layer adjacent the recording tape being activated to exhibit an adhesive action to the recording tape, while the remaining adhesive layers of each leader-trailer tape are passive with regard to an adhesive action during the normal use of the tape cassette, the adhesive layer having a characteristic of exhibiting an adhesive action only at conditions that would exist beyond the expected use of the tape cassette.

2. A tape cassette as defined in claim 1, wherein the adhesive layer exhibits an adhesive action under a pressure of at least 5 kg/cm$^2$.

3. A tape cassette as defined in claim 1, wherein the adhesive layer exhibits an adhesive action at a temperature of at least 200° C.

4. A tape cassette as defined in claim 1, wherein said adhesive means exhibit said adhesive action under a pressure of 5 to 10 kg/cm$^2$.

5. A tape cassette as defined in claim 1, wherein said adhesive means exhibits said adhesive action at a temperature of 200° to 300° C.

6. A tape cassette as defined in claim 1, wherein said adhesive layer is pressure sensitive.

7. A tape cassette as defined in claim 1, wherein said adhesive layer is heat sensitive.

* * * * *